United States Patent
Rowe et al.

(10) Patent No.: US 7,205,926 B2
(45) Date of Patent: *Apr. 17, 2007

(54) MULTI-SOURCE SURVEILLANCE SYSTEM

(75) Inventors: Richard L. Rowe, Saratoga, CA (US); Raymond R. Blasing, Los Altos, CA (US); Michael Fleisher, Sunnyvale, CA (US); Serge L. Nikulin, San Jose, CA (US); Thomas W. Grudkowski, Pleasanton, CA (US); Maya M. Radzinski, Palo Alto, CA (US); Thomas W. Trawick, San Jose, CA (US); Scott T. Trosper, Meridian, ID (US)

(73) Assignee: Safeview, Inc., Santa Clara, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 10/825,530

(22) Filed: Apr. 14, 2004

(65) Prior Publication Data

US 2005/0232459 A1 Oct. 20, 2005

(51) Int. Cl.
*G01S 13/89* (2006.01)
(52) U.S. Cl. .................... 342/22; 342/179; 342/27
(58) Field of Classification Search ............ 342/22, 342/179
See application file for complete search history.

(56) References Cited

U.S. PATENT DOCUMENTS

| | | | |
|---|---|---|---|
| 4,866,424 A | 9/1989 | Parks | |
| 4,901,084 A | 2/1990 | Huguenin et al. | |
| 4,910,523 A | 3/1990 | Huguenin et al. | |
| 4,940,986 A | 7/1990 | Huguenin | |
| 4,964,309 A | 10/1990 | Jenkins | |
| 5,039,981 A | 8/1991 | Rodriguez | |
| 5,047,783 A | 9/1991 | Hugenin | |
| 5,073,782 A | 12/1991 | Huguenin et al. | |
| 5,078,952 A | 1/1992 | Gozani et al. | |
| 5,115,459 A | 5/1992 | Bertozzi | |
| 5,162,652 A | 11/1992 | Cohen et al. | |
| 5,170,169 A | 12/1992 | Stephan | |
| 5,181,234 A * | 1/1993 | Smith ....................... 378/87 |
| 5,202,692 A | 4/1993 | Huguenin et al. | |
| 5,227,800 A | 7/1993 | Huguenin et al. | |
| 5,323,004 A | 6/1994 | Ettinger et al. | |
| 5,367,552 A | 11/1994 | Peschmann | |
| 5,397,986 A | 3/1995 | Conway et al. | |

(Continued)

OTHER PUBLICATIONS

U.S. Appl. No. 10/697,965, filed Oct. 30, 3002, unknown.

(Continued)

*Primary Examiner*—Thomas H. Tarcza
*Assistant Examiner*—Matthew M. Barker
(74) *Attorney, Agent, or Firm*—Kolisch Hartwell, P.C.

(57) ABSTRACT

A surveillance system can include a first sensor apparatus configured to interrogate a subject, including a person and objects carried by the person, with millimeter-wave electromagnetic radiation for imaging the subject. A supplemental source provides additional information about the subject that is relatable to objects potentially carried by the person. Relational information relates the produced image signal and the subject information. The supplemental source may be a second sensor apparatus adapted to detect a given characteristic of an object potentially carried by a person in the subject position. Relational information about whether the person is carrying an object having the given characteristic may then be produced.

48 Claims, 9 Drawing Sheets

U.S. PATENT DOCUMENTS

| | | |
|---|---|---|
| 5,455,590 A | 10/1995 | Collins et al. |
| 5,465,607 A | 11/1995 | Corrigan et al. |
| 5,557,283 A | 9/1996 | Sheen et al. |
| 5,592,083 A | 1/1997 | Magnuson et al. |
| 5,600,303 A | 2/1997 | Husseiny et al. |
| 5,680,103 A | 10/1997 | Turner et al. |
| 5,753,832 A | 5/1998 | Bromberg et al. |
| 5,760,397 A | 6/1998 | Huguenin et al. |
| 5,784,430 A | 7/1998 | Sredniawski |
| 5,818,047 A | 10/1998 | Chaney et al. |
| 5,859,609 A | 1/1999 | Sheen et al. |
| 5,930,326 A | 7/1999 | Rothschild et al. |
| 5,974,111 A | 10/1999 | Krug et al. |
| 6,040,191 A | 3/2000 | Grow |
| 6,057,761 A | 5/2000 | Yukl |
| 6,073,499 A | 6/2000 | Settles |
| 6,078,047 A | 6/2000 | Mittleman et al. |
| 6,088,423 A | 7/2000 | Krug et al. |
| 6,094,472 A | 7/2000 | Smith |
| 6,119,096 A | 9/2000 | Mann et al. |
| 6,137,896 A * | 10/2000 | Chang et al. ............... 382/118 |
| 6,215,851 B1 | 4/2001 | Meilunas et al. |
| 6,218,943 B1 | 4/2001 | Ellenbogen |
| 6,334,365 B1 | 1/2002 | Linker et al. |
| 6,342,696 B1 | 1/2002 | Chadwick |
| 6,344,818 B1 | 2/2002 | Markov |
| 6,375,697 B2 | 4/2002 | Davies |
| 6,469,624 B1 | 10/2002 | Whan et al. |
| 6,507,309 B2 | 1/2003 | McMakin et al. |
| 6,518,915 B2 | 2/2003 | Schutz et al. |
| 6,642,513 B1 | 11/2003 | Jenkins et al. |
| 6,665,373 B1 | 12/2003 | Kotowski et al. |
| 6,791,487 B1 | 9/2004 | Singh et al. |
| 6,901,163 B1 * | 5/2005 | Pearce et al. ............... 382/165 |
| 6,927,691 B2 * | 8/2005 | Yukl ....................... 340/568.1 |
| 6,937,182 B2 * | 8/2005 | Lovberg et al. ............... 342/22 |
| 6,952,163 B2 | 10/2005 | Huey et al. |
| 2003/0128150 A1 * | 7/2003 | McMakin et al. ............ 342/22 |
| 2003/0231788 A1 * | 12/2003 | Yukhin et al. .............. 382/115 |
| 2004/0090359 A1 * | 5/2004 | McMakin et al. ............ 342/22 |
| 2004/0140924 A1 * | 7/2004 | Keller et al. ................. 342/22 |
| 2004/0263379 A1 * | 12/2004 | Keller ......................... 342/22 |
| 2005/0110672 A1 * | 5/2005 | Cardiasmenos et al. ...... 342/27 |

OTHER PUBLICATIONS

U.S. Appl. No. 10/697,848, filed Oct. 30, 2003, unknown.
U.S. Appl. No. 10/607,552, filed Jun. 26, 2003, unknown.
U.S. Appl. No. 10/301,552, filed Nov. 21, 2002, McMakin.
*The Dielectric People Portal II*, Spatial Guardian Inc., www.spatialguardian.com/products/people_portal/index.shtml.
*Transportation Security What Works*, Spatial Guardian Inc., www.spatialguardian.com/news_transec_1102.shtml, Nov. 2002.

* cited by examiner

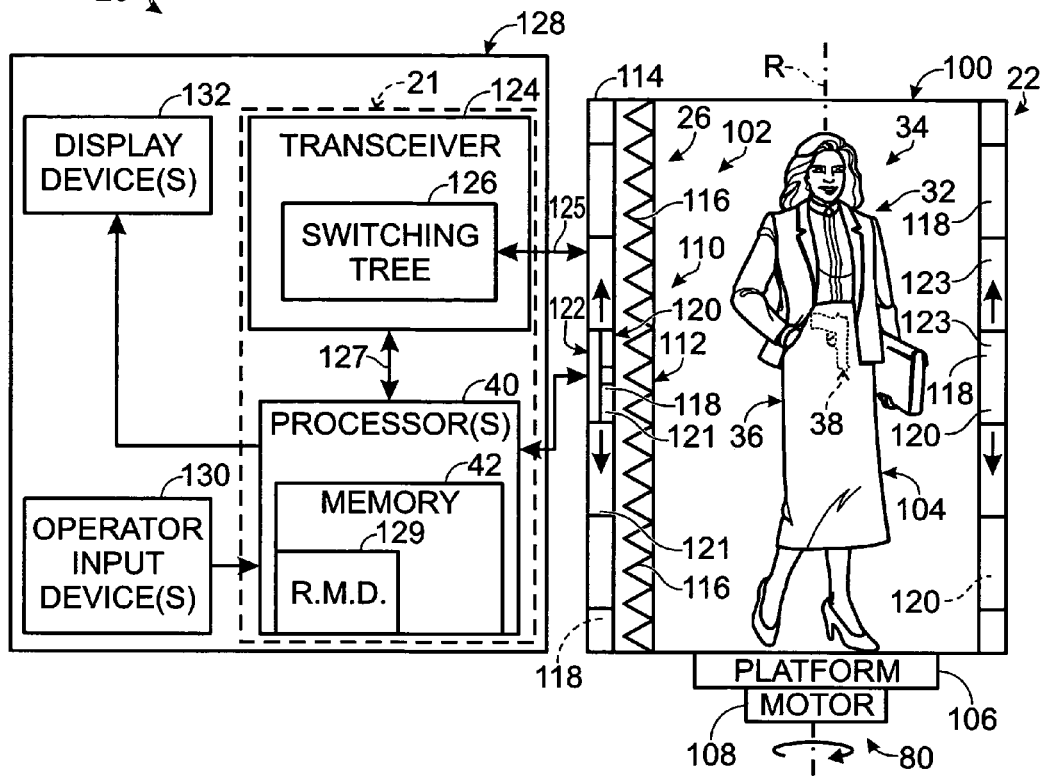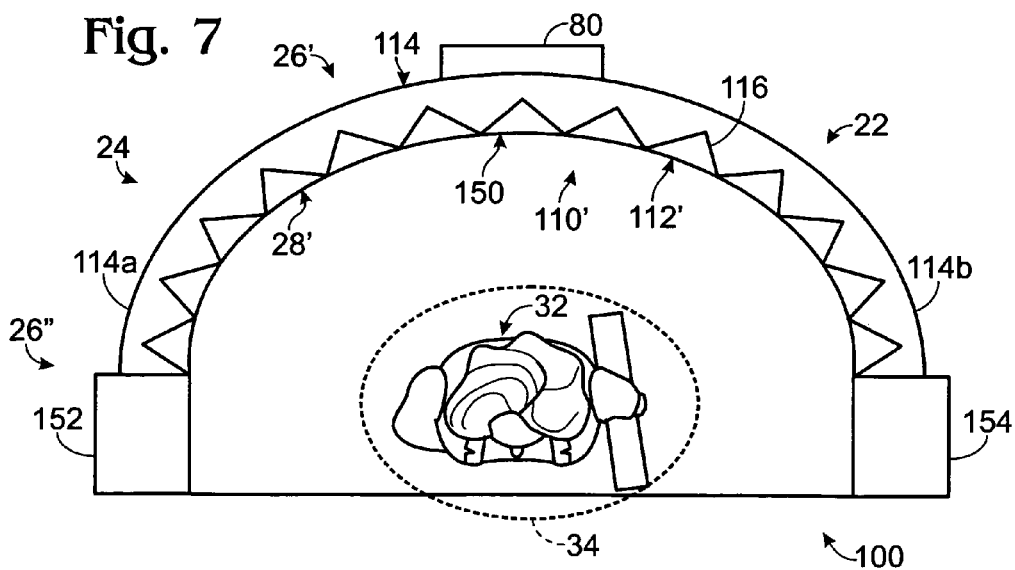

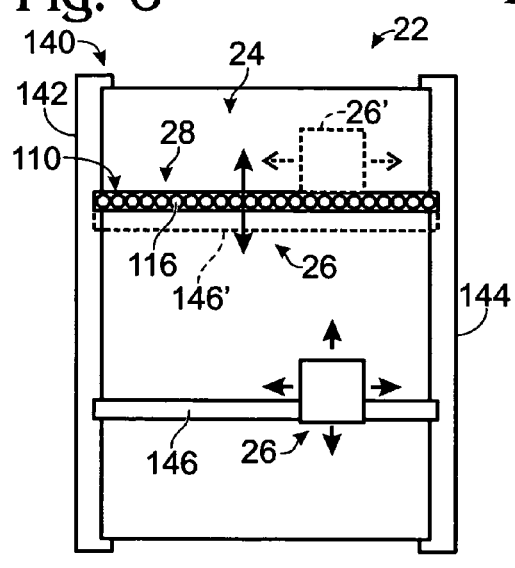
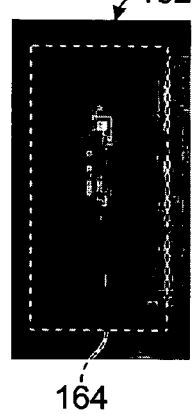
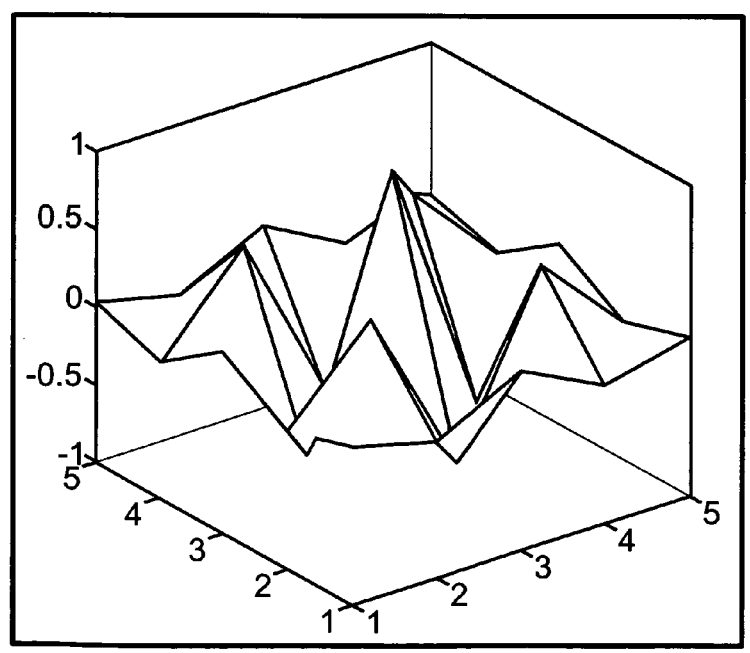

MULTI-SOURCE SURVEILLANCE SYSTEM

BACKGROUND

Millimeter wave signals are used for radar and telecommunications. They are also capable of being used to produce an image of a subject by directing millimeter-wave signals at the subject and detecting the reflected signal. Examples of such imaging systems are described in U.S. Pat. Nos. 5,455,590; 5,557,283; 5,859,609; and 6,507,309; U.S. patent application Ser. No. 10/607,552 filed Jun. 26, 2003; U.S. patent application Ser. No. 10/697,848 filed Oct. 30, 2003; U.S. patent application Ser. No. 10/301,522 filed Nov. 21, 2002; and U.S. patent application Ser. No. 10/697,965 filed Oct. 30, 2003, which patent references are incorporated herein by reference.

Imaging systems, as described above provide relatively detailed images of a subject, including a person's body and any objects carried by the person, whether or not the objects are concealed. An operator can view images of a subject and visually identify objects included with the person. Other detection devices can also be used to obtain other information about a subject. For instance, the subject can pass through a metal detector to determine if the subject has a detectable metal object. When the surveillance system is part of a process of boarding a public transportation vehicle, or entering a public or protected facility, substantial delays may be realized. Further, the effectiveness of the surveillance depends on the accuracy and attentiveness of the operator or operators.

BRIEF SUMMARY OF THE DISCLOSURE

A surveillance system can include a first sensor apparatus configured to transmit toward and receive from a subject in a subject position, millimeter-wave electromagnetic radiation. A subject may include a person and any object or objects carried by the person. Such a system can also include a controller configured to operate the sensor apparatus, and produce image data representative of an image of the subject from received radiation. Some surveillance systems also include a source of subject information about the subject that is relatable to objects potentially carried by the person. The controller then is adapted to produce relational information relating the produced image signal and the subject information.

In some surveillance systems, the source of subject information is a second sensor apparatus adapted to detect a given characteristic of an object potentially carried by a person in the subject position. The controller in such a system, is accordingly adapted to produce relational information about whether the person is carrying an object having the given characteristic. The second sensor apparatus may be adapted to detect one or more of a variety of subject information.

BRIEF DESCRIPTION OF THE SEVERAL FIGURES

FIG. 5 is a general diagram showing an example of a surveillance according to FIG. 1 and including a subject information assembly of FIG. 4.

FIG. 6 is a side view of another example of a subject information assembly of FIG. 3.

FIG. 7 is a top view of yet another example of a subject information assembly of FIG. 3.

FIG. 8 is an image generated by a millimeter-wave imaging system of a mannequin having objects hidden by clothes on the mannequin.

FIG. 9 is an enlarged view of a portion of the image of FIG. 8 showing an object.

FIG. 10 is a graphic illustration of the values of a kernel used for object detection.

DETAILED DESCRIPTION OF VARIOUS EMBODIMENTS

Figure 1:
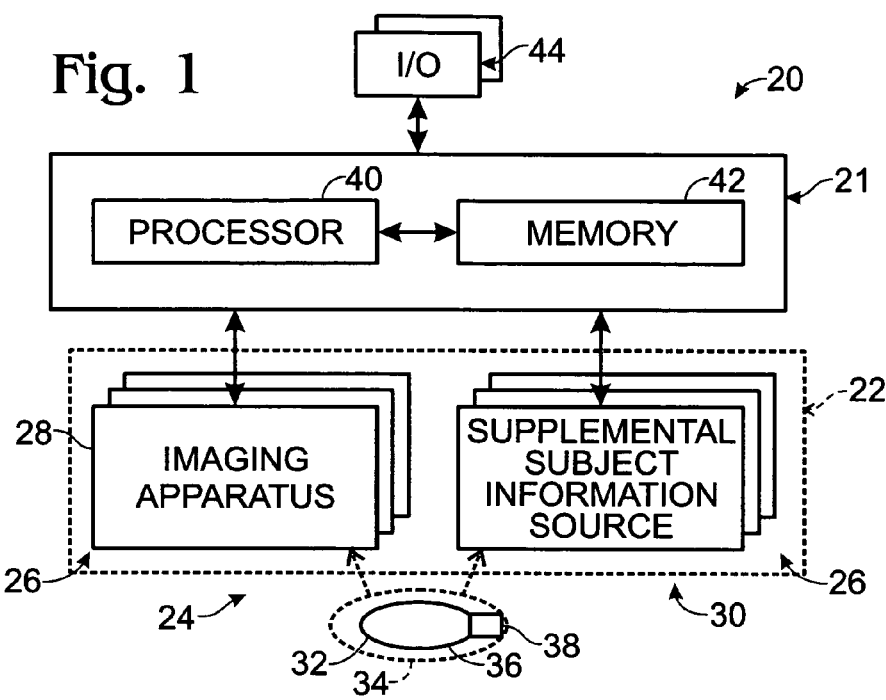
FIG. 1 is a block diagram depicting a general surveillance system having an imaging source and a supplemental subject information source.

FIG. 1 depicts a general surveillance system 20 including a controller 21 and a subject-information assembly 22 including a plurality of subject-related information sources 24. The subject information sources may include one or a plurality of sensor apparatus 26, such as an imaging apparatus 28, and depending on the configuration, one or a plurality of supplemental subject information sources 30. The subject information sources provide information relative to a subject 32 in a subject position 34.

A subject 32 includes all that is presented in an interrogation station of an imaging system for imaging, whether human, animal, or inanimate object. For example, if a person 36 is in an interrogation station for imaging, the subject 32 includes the person as well as any objects 38 supported on the person, such as watches, keys, jewelry, pocket or other knives, coins, clothing accessories, guns, or any other objects that can be imaged.

An example of an imaging apparatus 28 is an active imaging apparatus adapted to transmit toward and receive from a subject in a subject position, millimeter-wave electromagnetic radiation. In some examples, the millimeter-wave radiation may be in the frequency range of 100

Megahertz (MHz) to 2 Terahertz (THz) range. Generally, the corresponding wavelengths range from several centimeters to a few micrometers. Such radiation may be either at a fixed frequency or over a range or set of frequencies using several modulation types, e.g. chirp, pseudorandom frequency hop, pulsed, frequency modulated continuous wave (FMCW), or continuous wave (CW).

Some embodiments of imaging apparatus may use a transmitting signal that incorporates frequencies in the range of 24 to 30 GHz, FMCW modulation, and having signal content that meets FCC unlicensed operation requirements and is outside of any restricted US Government frequency bands. Pulse lengths may range from 2–10 microseconds. Antennae beam widths may range from 20–120 degrees for broad beam implementation, or less than 30 degrees for narrow beam width applications, depending on the image formation signal processor requirements. Various system polarizations may be used. Examples include same polarization, cross polarization, elliptical polarization, right circular polarization, and/or left circular polarization.

Certain natural and synthetic fibers may be transparent or semi-transparent to radiation of such frequencies and wavelengths, permitting the detection and/or imaging of surfaces positioned beneath such materials. When the subject of interrogation is a clothed individual, image information about portions of a person's body covered by clothing can be obtained with system 20, as well as those portions that are not covered by clothing. Further, image information relative to objects carried by a person beneath clothing, regardless of how they are supported on the person, can be provided with system 20 for metal and non-metal object compositions, such as those used for weapons and contraband.

Controller 21 can be adapted to operate the sensor apparatus 26. In the example shown in which a sensor apparatus is an imaging apparatus 28, the controller is adapted to produce image data representative of an image of the subject from received radiation. Supplemental subject information sources 30 provide information about the subject 32 that is relatable to objects 38 potentially carried by the person 36. The source may be of a type that is different from imaging apparatus 28. The controller then is adapted to produce relational information relating the produced image signal and the subject information.

In some surveillance systems 20, a supplemental source 30 of subject information is a second sensor apparatus 26 adapted to detect a given characteristic of an object potentially carried by a person in the subject position. The controller 21 in such a system 20, is accordingly adapted to produce relational information about whether the person is carrying an object having the given characteristic. The second sensor apparatus may be adapted to detect one or more of a variety of subject information. The sensor apparatus may function sequentially or concurrently with other sensor apparatus. For example, the second sensor apparatus may detect one or more of a substance, such as a metal, explosive or other chemical substance; a feature identifying the person 36, such as a retinal image, facial image, fingerprint, volumetric or topographical representation of all or a portion of the body, other biometric feature, an identification or categorization badge or insignia, such as an insignia representing that the person belongs to a certain group, such as a security or police force, or RFID device. Trace element detection can be based on ion mass spectrometry, quadrupole resonance, Fourier-transform infrared spectroscopy, vapor detection, chemical biological sensing, laser measurement, fluorescence, DNA analysis, and MEMS. Optionally, a supplemental source 30 may include context data stored in a memory. Context data relates to a person or potential objects carried by the person, such as historical data relating to information previously detected or input about the particular person, any clearance the person might have to carry particular types of objects, such as guns or other security or law-enforcement devices, or other data that is considered to assist operators of surveillance system 20 in detecting and assessing the significance of objects carried by the surveilled person.

Controller 21 can include a processor 40 in the form of any suitable component for processing the image data, such as digital circuitry, analog circuitry, or both. Processor 40 may be programmable, such as a computer or microprocessor, a dedicated hardwired state machine, a logic unit, or a combination of these. For a multiple processor form, distributed, pipelined, and/or parallel processing can be utilized as appropriate.

Processor 40 may include a memory 42. Memory 42 can be solid state, electromagnetic, optical, or a combination of these, and it can be volatile and/or nonvolatile. Further, it may be dedicated, such as a resident hard drive, a random access memory (RAM), or a removable, such as a removable memory device (R.M.D.). Presently typical removable memory devices include a floppy disc, tape cartridge, optical disc (CD-ROM or DVD), or other appropriate type. Memory 42 also may be a remote memory coupled to the processor by a wired or wireless communication link via another processor and/or network.

Controller 21 may be coupled to suitable input and/or output devices 44 adapted to receive data and transmit output data, such as a communication link to another system or other remote output device. Exemplary input devices may include a keyboard, mouse or other cursor-control device, a voice recognition input system, or other appropriate device or system. Output devices may include visual or audio alarms, printers, communications links, or displays, such as cathode ray tube (CRT), Liquid Crystal Display (LCD), plasma, organic light emitting diode (OLED), or other appropriate display type. Appropriate communication links may include local area networks (LANs), municipal area networks (MANs), or Wide Area Networks (WANs), whether private or public.

Figure 2:
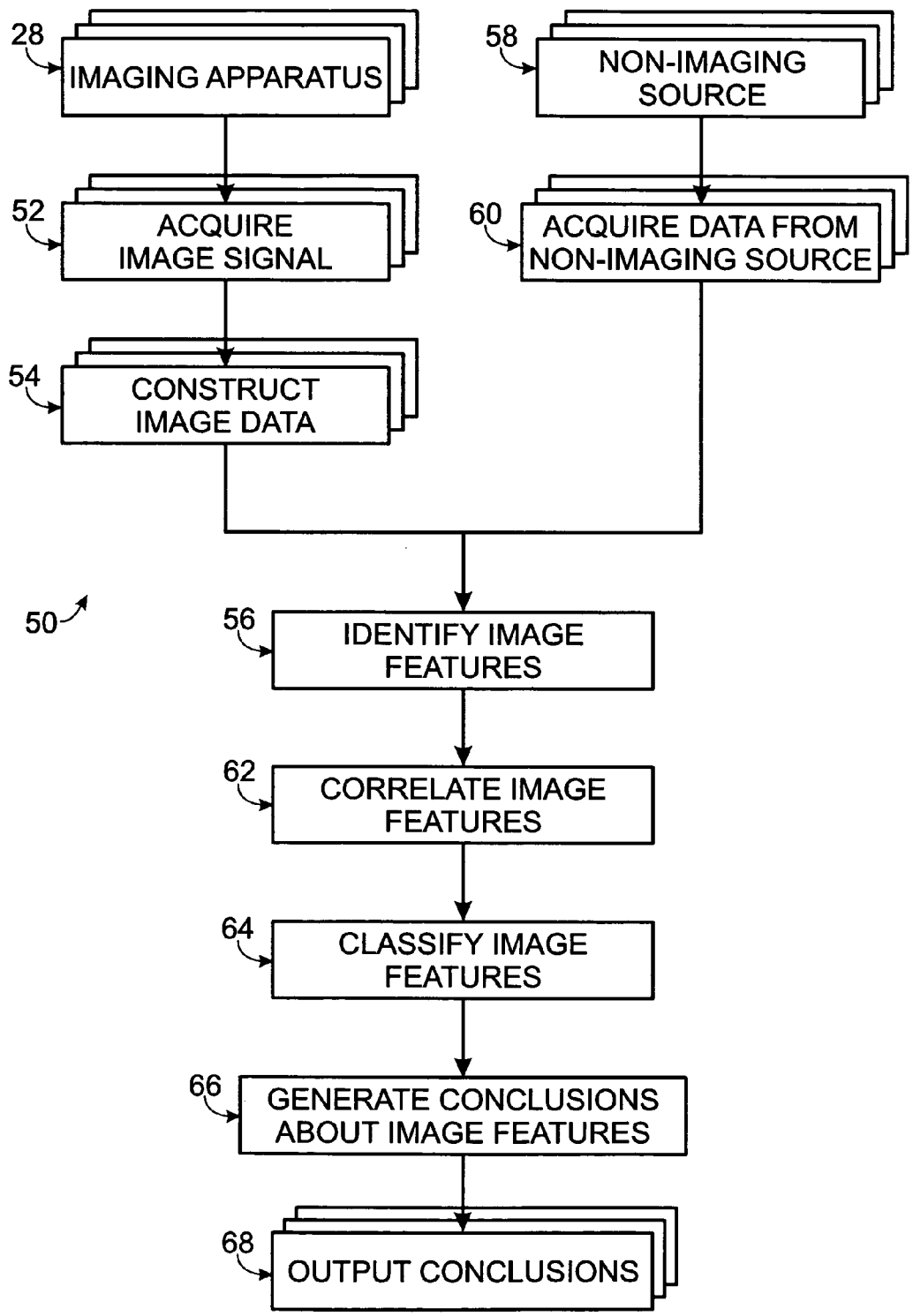
FIG. 2 is a general flow chart illustrating an example of a method of operation of the surveillance system of FIG. 1.

A general flow chart 50 illustrating exemplary operation of surveillance system 20, is shown in FIG. 2. Two data acquisition phases are illustrated. Where one or more of the subject information sources 24 are imaging apparatus 28, each imaging apparatus detects image information and produces a detected signal. Imaging apparatus can include apparatus that detects information relatable to zones or positions of the subject, such as subject surfaces or characteristics, as may be realized, such as using received radiation of appropriate form, such as acoustical waves, optical radiation, infrared radiation, millimeter-wave radiation or other radio-frequency radiation, Terahertz radiation, and x-ray radiation. The image signals are acquired for each imaging apparatus at 52. The acquired image signal is then processed at 54 to construct image data. Image features are then identified at 56. As is explained further below, image features derived from image data may be the shape, configuration, arrangement, or location of one or more objects 38 relative to a person 36.

Where one or more subject information sources 24 is a non-imaging source 58, the data from the non-imaging source is acquired at 60. A non-imaging source may be a sensor that detects general features of the subject, such as the general detection of a substance, a feature identifying the person 36, or context data stored in a memory relating to the subject. Image features are then identified at 56. The detection of the existence of a substance or an identification of the person or, a characteristic, class or categorization of the person, and other appropriate indicators or information are considered features of the subject.

Image features from the various subject information sources 24 are then correlated with each other at 62. For example, the identification of an object on the side of a person from an imaging apparatus may be correlated with the detection of metal in the middle zone of the person, a badge identifying the person, and context data previously stored in memory indicating that the person is a security guard and has high security clearance.

These correlated features may then be classified at 64 based on the combination of features. Classification of features is a logical process for determining the likelihood that a detected feature is a suspect object or a false alarm. For example, the detection of metal in the same zone as an object indicates that there is a high likelihood that the object is metal. Further, given that the person is identified as a security guard, it is highly likely that the object is a gun. Also, the person may be authorized to carry a gun in this position as part of her duties. The object would thus be given a high weight of being a suspect object, but given a low weight as a security risk, due to the status of the person as a security guard.

The processor may use a relational database to relate the various possible features relating to a subject that is surveilled. As a general example, the following truth table illustrates how two or three features, identified as features A, B, and C, may be related. Based on a determined relationship, an attribute, weight, or value, Vx, may be assigned to each combination. In this example, reference is made to a value, which term is intended to include attribute, weight, or other relative indicator. These values may be different or the same for different relationships, depending the application.

| Does Condition Exist? | | | | | | |
|---|---|---|---|---|---|---|
| A | B | C | A∧B | Value | A∧(B∧C) | Value |
| Yes | Yes | Yes | A (B) | $V_1$ | A (B∧C) | $V_5$ |
| Yes | Yes | No | | | A (B∧C̄) | $V_6$ |
| Yes | No | Yes | A (B̄) | $V_2$ | A (B̄∧C) | $V_7$ |
| Yes | No | No | | | A (B̄∧C̄) | $V_8$ |
| No | Yes | Yes | Ā (B) | $V_3$ | Ā(B∧C) | $V_9$ |
| No | Yes | No | | | Ā(B∧C̄) | $V_{10}$ |
| No | No | Yes | Ā (B̄) | $V_4$ | Ā(B̄∧C) | $V_{11}$ |
| No | No | No | | | Ā(B̄∧C̄) | $V_{12}$ |

A(B) = A has the condition B
Example:
If A: image anomaly
B: metal is detected
C: explosive is detected
Ā: no anomaly detected
B̄: no metal detected
C̄: no explosive detected Any set of corresponding features can be assigned a corresponding relative indicator, such as weight, value or attribute. For instance, an object identified in both a visible image and a millimeter-wave-based image can have a low value, since the object is visible. On the other hand an object identified on a millimeter-wave-based image that is not visible, can be assigned a high value. Infrared sensors can also be used to confirm the existence of hidden objects, and can identify a hidden object that is not detected on a subject using millimeter-wave-based imaging. An area of a subject can thus be assigned a high value even though no image object is detected. For example, a sheet of plastic explosive taped to a person's body may appear "colder" than the rest of the person's body. Also, the combination of explosive and metal detectors, may be used to identify an imaged object as likely to be a plastic bomb with metal pieces. Such an object may then be given a very high value.

An object's (or subject area's) value may thus be based on the substances the object (or subject) includes, such as metal, plastic, dielectric, ceramic, tissue, fabric, paper, stone, plant matter. The structure of the object also can be the basis of assigning a value, such as dimensions, shape and edge characteristics. The chemical make-up of an object can also be the basis for assigning a value, including drugs, and explosives, such as PTEN, TNT, plastic, C-4 and datasheet.

Once the image features are classified, then conclusions are generated at 66 about the combinations of image features.

A(B∧C): detected anomaly is metal and is explosive.
A(B∧C̄): detected anomaly is metal and is not explosive.
A(B̄∧C): detected anomaly is not metal and is explosive.
A(B̄∧C̄): detected anomaly is not met and is not explosive.
Ā(B∧C): undetected anomaly is metal and is explosive.
Ā(B∧C̄): undetected anomaly is metal and is not explosive.
Ā(B̄∧C): undetected anomaly is not metal and is explosive.
Ā(B̄∧C̄): undetected anomaly is not metal and is not explosive.

The various conclusions may then be output at 68, as appropriate, such as via a display, report or alarm condition.

Figure 3:
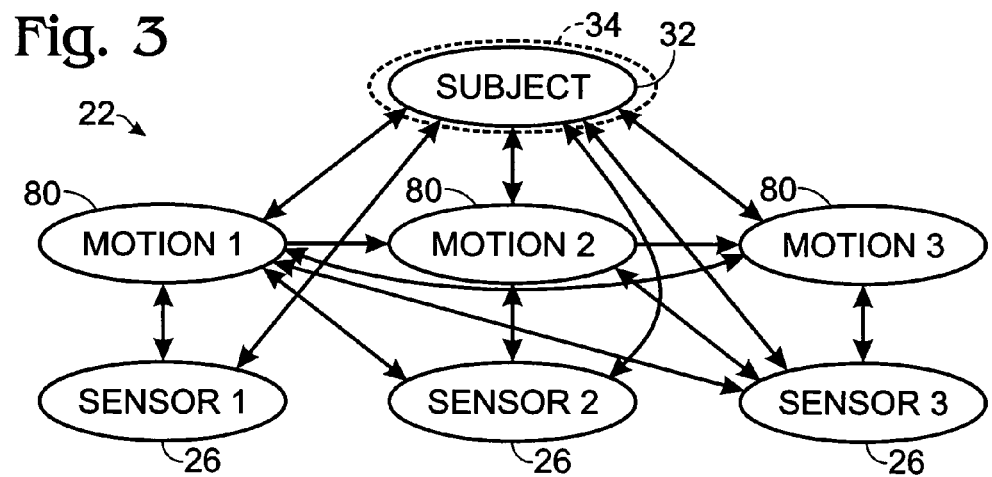
FIG. 3 is an exemplary diagram illustrating various possible configurations for subject information assemblies usable in the surveillance system of FIG. 1, and having up to three sensors that move relative to a subject.

There are various ways in which a subject information assembly can be configured. A surveillance system, in which sensor apparatus are mounted relative to a subject position and relative to the different sensor apparatus, can provide for different moving or non-moving configurations. For example, a given sensor apparatus may be adapted to move relative to the subject position but not move relative to one or more other sensor apparatus. FIG. 3 illustrates various possible configurations for a subject-information assembly 22 that includes three sensor apparatus 26 mounted relative to a subject 32 in a subject position 34. Optionally, the sensor apparatus may be mounted for motion relative to the subject position and to one another by motion apparatus 80. A motion apparatus is any appropriate device that provides mechanical motion of a sensor apparatus relative to the subject position or relative to another sensor apparatus or another motion apparatus. Examples of possible motion apparatus include a motor acting on a pinion guided along a rack, or a stepper motor moving a sensor apparatus along a track.

As used herein, moving a specified element M relative to another specified element N means the same thing as moving element N relative to element M. For example, element M could be fixed to a frame, and element M could be moved relative to element N by moving element N relative to the frame.

An arrow between two components shown in FIG. 3 represents a corresponding relationship. For instance, an arrow directly between the subject position 34 and a sensor apparatus 26 is intended to represent that the sensor apparatus does not move relative to the subject position. On the other hand, an arrow extending between the subject position and a motion apparatus, and between the motion apparatus and a sensor apparatus, indicates that the sensor apparatus moves relative to the subject position. This could be accomplished, for instance, by rotating the subject position on a floor and holding the sensor apparatus fixed relative to the floor, by holding the subject position fixed relative to the floor and moving the sensor apparatus along the floor, or by moving independently both the subject position and the sensor apparatus relative to the floor.

There are numerous possible configurations, a portion of which are shown in the figure. For example, where all three sensor apparatus are adapted to move relative to the subject position, this can be provided by one, two or three (or more) motion apparatus. Where two or three motion apparatus are used, the second and subsequent motion apparatus may be mounted relative to one or more other motion apparatus, thereby potentially providing for the capability of moving concurrently in multiple directions, depending on how the respective movement apparatus are operated.

Figure 4:
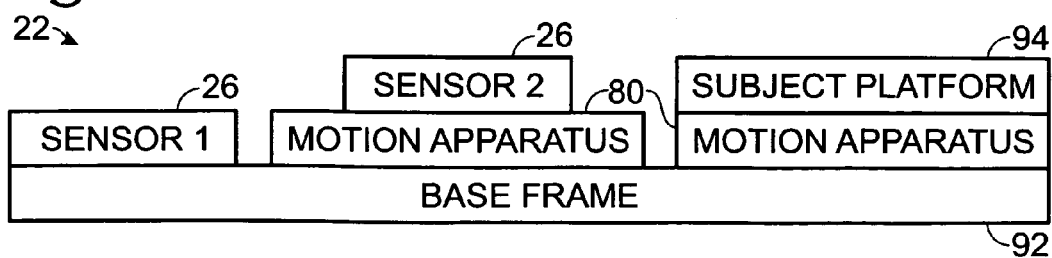
FIG. 4 is a block diagram illustrating an example of a subject information assembly of FIG. 3 having two sensor apparatus.

FIG. 4 illustrates an optional configuration in block diagram form of a subject information assembly 22 that may be used in a surveillance system 20. Subject information assembly 22 may include a base frame 92, which may be a floor or other work surface, relative to which a first sensor apparatus 26 is directly mounted. A first motor or other motion apparatus 80 is mounted for providing relative motion between the base frame and a second sensor apparatus 26. A subject platform 94, which defines the subject position 34, may then be mounted relative to a second motion apparatus 80 mounted in turn relative to base frame 92.

An example of a surveillance system 20 having a subject-information assembly, 22 configured as shown in FIG. 4, is depicted in FIG. 5. System 20 of FIG. 5 includes a controller 21 adapted to control a subject information assembly 22 mounted in a surveillance station or portal 100 defining a subject position 34. In this example, subject information assembly 22 includes a first sensor apparatus 26 in the form of an active, millimeter-wave imaging apparatus 102, adapted to interrogate subject 32 by illuminating it with electromagnetic radiation in the 100 Megahertz (MHz) to 2 Terahertz (THz) frequency range and detecting the reflected radiation, as has been described.

As illustrated in FIG. 5, subject 32 includes a person 36 presented for interrogation by system 20. Person 36 is shown wearing clothing 104, which conceals object 38, shown in the form of a weapon. Subject 32 is positioned in interrogation station or portal 100 of system 30. Portal 100 may be configured for placement at a security checkpoint where it is desired to detect objects, such as weapons or contraband, on the person. Portal 100 may include a platform 106 connected to a motion apparatus 80 in the form of a motor 108. Platform 106 may be arranged to support subject 32. Motor 108 may be arranged to selectively rotate about rotational axis R while subject 32 is positioned thereon. For the configuration shown, axis R may be vertical, and subject 32 may be in a generally central subject position 34 relative to axis R and platform 106.

Imaging apparatus 102 may include an antenna apparatus 110 including a primary multiple-element sensing array 112. Subject information assembly 22 may include a frame 114 on which array 112 is supported. Array 112 may extend the full height of frame 114. Motor 108 causes platform 106, and subject 32 to rotate about axis R. As a result, array 112 circumscribes a generally circular pathway about axis R. The antenna array may be about 0.5 to about 2 meters from radius R.

Antenna array 112 may include a number of linearly arranged elements 116 only a few of which are schematically illustrated. Each element 116 may be dedicated to transmission or reception of radiation, and the elements may be arranged in two generally vertical columns, with one column dedicated to transmission, and the other to reception. The number and spacing of the elements corresponds to the wavelengths used and the resolution desired. A range of 200 to about 600 elements can span a vertical length of about two or two and one-half meters.

Subject information assembly 22 includes a second sensor apparatus 118. Optionally, additional sensor apparatus may be mounted to second sensor apparatus 118, such as a third sensor apparatus 120. The second sensor apparatus may be mounted by a prime mover 122, for vertical movement along frame 114. Thus, as platform 106 rotates about axis R, sensor apparatus 118 scans the zone or location of the subject corresponding with the vertical position of the sensor and the rotational position of the subject.

Various other configurations for portal 100 and antenna apparatus 110 may be used. For example, a two-dimensional transmit and receive array may be used, as well as an array that moves around a fixed subject platform, or an array that moves vertically and extends horizontally. Further, many variations of an antenna apparatus are possible. The antenna apparatus may include one or more antenna units, and each antenna unit may include one or more transmitting antennae and one or more receiving antennae. An antenna unit may include a plurality of antennae that may receive radiation in response to transmission by a single antenna. The antennae may be any appropriate type configured to transmit or receive electromagnetic radiation, such as a slot line, patch, endfire, waveguide, dipole, semiconductor, or laser. Antennae may both transmit and receive. The antennae units may have one or more individual antennae that transmit or receive like polarization or unlike polarized waveforms such as plane, elliptical, or circular polarization, and may have narrow or broad angular radiation beam patterns, depending on the application. Beam width may be relatively broad, i.e. 30 to 120 degrees for imaging applications that use holographic techniques, while narrow beam widths in the range of 0 to 30 degrees may be used for applications having a narrow field of view requirement.

Further, a single antenna may scan a subject by mechanically moving about the subject in a one- or two-dimensional path. A one- or two-dimensional array of antenna units may electronically and mechanically scan a subject. An imaging system may include one or a plurality of antenna apparatus. The antennae apparatus may be protected from the environment by suitable radome material, which may be part of the apparatus, or separate, depending on the mechanical motion that is required of the antennae apparatus or array. Examples of other array configurations are illustrated in copending patent application Ser. No. 10/728,456 filed Dec. 5, 2003, entitled "Millimeter-Wave Active Imaging System" incorporated herein by reference.

Antenna apparatus 48 may be configured to transmit and receive electromagnetic radiation selected from the range of about 1 Gigahertz (GHz) to about 2 THz, or from the range of about 100 MHz to about 15 GHz, depending on the impulseduration. A range of about 1 GHz to about 300 GHz may also be used, with a range of about 5 GHz to about 110 GHz particularly useful for imaging. A range of 24 GHz to 30 GHz is used in some antenna apparatus. The antenna apparatus produces an image signal 68 representative of the received radiation.

Various configurations of second and third sensor apparatus are also possible. For example, a plurality of sensor apparatus 118 may be mounted along antenna array 112 in fixed positions. Each sensor apparatus 118 or 120 may have a sensor unit 121 (such as a receiver) on one side of subject position 34 and a complementary unit (such as a transmitter) on an opposite side or other spaced position, as represented by sensor unit 123.

A controller 21 may control operation of subject information assembly 22. Controller 21 may include a transceiver 124 including a switching tree 126 configured to irradiate subject 32 with only one transmitting element 116 at a time, and simultaneously receive with one or more elements 116. Transceiver 124 may include logic to direct successive activation of each combination of transmit and receive antenna elements to provide a scan of a portion of a subject 32 along a vertical direction as platform 106 and the subject rotate.

An image signal 125 received from antenna apparatus 110 may be downshifted in frequency and converted into an appropriate format for processing. In one form, transceiver 124 may be of a bi-static heterodyne Frequency Modulated Continuous Wave (FM/CW) type like that described in U.S. Pat. No. 5,859,609. Other examples are described in U.S. Pat. Nos. 5,557,283 and 5,455,590. In other embodiments, a mixture of different transceiver and sensing element configurations with overlapping or non-overlapping frequency ranges may be utilized, and may include one or more of the impulse type, monostable homodyne type, bi-static heterodyne type, and/or other appropriate type.

Transceiver 124 may provide image data 127 corresponding to the image signals to one or more processors 40. Processor 40 can include any suitable component for processing the image data, as appropriate. Processor 40 is coupled to a memory 42 of an appropriate type and number. As has been mentioned, memory 42 may include a removable memory device 129, as well as other types of memory devices.

Controller 21 may be coupled to motor 108, prime mover 122, or other drive element used, to selectively control the rotation of platform 106 or movement of a sensor apparatus 26. Controller 21 may be housed in a monitor and control station 128 that also includes one or more input/output devices 44, such as operator input devices 130 and one or more display or other type of output devices 132.

FIG. 6 illustrates a simplistic side view of another embodiment of a subject information assembly 22, usable in surveillance system 20 as has been described. In this example, subject information assembly 22 has a base frame 140 including left upright 142 and right upright 144. A first information source 24 is a sensor apparatus 26 in the form of an imaging apparatus 28, and in particular, an antenna apparatus 110, such as was described with reference to FIG. 5.

Antenna apparatus 110 includes array elements 116, that may be mounted by a primary motion apparatus, not shown, to frame 140 for moving vertically. A second sensor apparatus 26 may be mounted relative to an intermediate frame 146 by a second motion apparatus, also not shown. In turn, intermediate frame 146 may be mounted relative to base frame 140 by a further motion assembly, also not shown. The subject information assembly 22 shown in FIG. 6 thus may provide for independent movement of the first and second sensor apparatus 26. Optionally, a second sensor apparatus 26' may be mounted on an intermediate frame 146' for movement with the first sensor apparatus 26 and relative to (along) the antenna apparatus 110.

A simplified top view of a further variation of a subject information assembly 22 for a portal 100 and usable in a surveillance system 20, is shown in FIG. 7. In this example, subject information sources 24 include first and second sensor apparatus 26. A first sensor apparatus 26' includes an active millimeter-wave imaging apparatus 28', as described above, having an antenna apparatus 110' formed as a horizontal array 112'. Array 112' may have various configurations, and is shown with array elements 116 extending in a convenient arc 150 around a subject 32 in a subject position 34.

Array 112' is shown mounted on a frame 114 having opposite distal ends 114a and 114b. Second sensor apparatus 26" also includes a first sensor unit 152 and a second sensor unit 154 mounted, respectively, on frame ends 114a and 114b. Sensor units 152 and 254 may be the same type of sensor, or different types of sensors, when a single sensor unit is sufficient. If sensor apparatus 26" is of a type that requires a send or transmit unit and a spaced-apart complementary receive unit, then the two sensor units can be the two components required. Examples of such sensor apparatus include metal detectors, some imaging systems, and trace chemical detectors. With trace chemical detectors, one sensor unit may direct air toward the subject, such as by a fan, and a second sensor unit draws in the air, which air is then checked for the trace element or elements of interest.

By traveling vertically with the imaging array 112, the second sensor apparatus 26" senses subject information at a level corresponding with the position of the imaging array. As a result, characteristics of the image in the position or zone of the image corresponding to which supplemental subject information is detected, can be correlated with the subject information to provide further information relating to the detected image of the subject. Other configurations for the second sensor apparatus can also be realized. For example, the sensor units may be mounted in fixed positions on a fixed portion of frame 114. Also, a plurality of sensor units can be distributed vertically along fixed portions of frame 114, and mounted in fixed positions independent of array 112', to provide zonal subject information. Optionally, the sensor units may be mounted independent of imaging apparatus 28', and may move or not, as was discussed with reference to subject information assembly 22 shown in FIG. 3. For instance, a sensor unit may be a device for receiving a card, token or other item handled by the surveilled person, which item is then tested for a trace element. Another technique for obtaining a trace element would be to mount the sensor units in handles that the person grasps during imaging. The surface of the handles could be wiped or removed and tested for trace elements, or air could be drawn in through or around the handle for testing.

A motion apparatus 80 is adapted to move the first and second sensor apparatus 26 vertically. Accordingly, a subject 32 may be imaged on one side by moving the array vertically from top to bottom or from bottom to top. In order to image both sides of a subject, then, it is necessary to scan the opposite side of the subject. This can be accomplished in various ways, such as having the subject turn around. Optionally, a second array, opposite the array shown, could be provided. Also, the array shown could be rotated around the subject position.

Following is a description that illustrates a method for providing a blurred image of a subject for protection of privacy concerns of surveilled subjects, as well as for automatic identification of portions of an image suspected of including objects carried by the surveilled person. This description is presented largely in terms of display images, algorithms, and symbolic representations of operation of data bits within a computer memory. It may be preferred to implement a program or algorithm as various interconnected distinct software modules or features. This is not necessary, as software, firmware, and hardware may be configured many different ways, and may be aggregated into a single processor and program with unclear boundaries.

An algorithm is generally considered to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. When stored, they can be stored, transferred, combined, compared, and otherwise manipulated. When stored, they may be stored in any computer-readable medium. As a convention, these signals may be referred to as data, bits, values, elements, symbols, characters, images, terms, numbers, or the like. These and similar terms may be associated with appropriate physical quantities and are convenient labels applied to these quantities.

The present disclosure also relates to apparatus for performing these operations, such as has been described. This apparatus may be specially constructed for the required purposes or it may comprise a general-purpose computer selectively activated or reconfigured by a computer program stored in the computer or other apparatus. In particular, various general-purpose machines may be used with programs in accordance with the teachings herein, or it may prove more convenient to construct more specialized apparatus to perform the required method steps. The required structure for a variety of these machines will appear from the description given below. Useful machines for performing the disclosed operations include general-purpose digital computers, microprocessors, or other similar devices, as has been described.

The programs described need not reside in a single memory, or even a single machine. Various portions, modules or features of it can reside in separate memories, or even separate machines. The separate machines may be connected directly, or through a network, such as a local access network (LAN), or a global or wide area network, such as what is known as the Internet. Similarly, the users need not be collocated with each other, but each only with a machine that houses a portion of the program.

Various techniques may be used for identifying objects that may be associated with a person being imaged. For example, once a first image of a subject has been obtained, objects are detected visually by an operator of the system or automatically. When manual detection is used, a primary or first image 160, such as the image of FIG. 8, may be displayed on a system monitor. An operator may then identify positions or areas of the image that are suspected of being objects. For example, FIG. 9 illustrates an enlarged second image 162 of a portion of the image of FIG. 8 as defined by an outline 164 around the suspect area. Such an area may be defined and the enlarged image produced using image-enhancing algorithims. Such a program may also provide for image enhancement and increased resolution, in order to produce a clearer image of the region in a selected suspect area. For instance, the program may increase the number of picture elements or pixels used to image the suspect area. Image enhancement tools, such as interpolation techniques, may be used to make the image sharper.

Once a suspect area containing a possible object other than the person, is identified, the antenna apparatus may be used to provide a more detailed image of the suspect area. For instance, a secondary antenna array, not shown, may be used to re-image the suspect area in greater detail than was originally provided.

Optionally, imaging arrays may be used to re-image the suspect area. Increased resolution may be possible by increasing the firings per surface area of the subject, such as by reducing the rate of movement of the subject relative to the antenna array, or increasing the scanning rate for the antenna array. It may also be possible to produce the first, low-resolution image using a portion of antenna elements in the array, and to produce a second, higher-resolution image using all of the antenna elements corresponding to the selected region of the subject.

Accordingly, the image signal, whether it be a reworking of the portion of the image signal corresponding to the first image or a portion of the image signal corresponding to a rescan of the selected subject area, a secondary image may be produced that has a higher resolution than the primary image. This image may then be displayed for observation by an operator, to better determine whether an object is present, and if so, the nature of the object.

Characteristics of image data may also be automatically analyzed to determine whether there may be areas of an image that may include an object. Regions of a subject image that have characteristics that correspond to characteristics of images of known objects may be identified. By automatically identifying suspect areas of an image, a system operator's attention may be directed to such areas, the information may be used to activate alarms, and the information may be used to initiate a rescanning of the suspect areas or to otherwise increase the resolution of the image.

It has been found that objects carried by a person may have the appearance of a "wavy texture" in the vicinity of objects hidden on a person. FIG. 8 shows an example of an image 160 of a mannequin with man-made objects placed on its body. This image is comparable to an image of a person. This image is comparable to an image of a person. In the figure, the image of a knife appears on the abdomen, and an image of a gun appears on the back. Second image 162 shown in FIG. 9 is an enlargement of the image of the knife shown in FIG. 8. An image characterized as having picture elements with alternating high and low intensity levels, appearing as light and dark regions, may be suspected of being an object. This varying intensity level pattern or wavy texture pattern is visible in the image on and/or around the object.

The waviness may be detected by convolving the image with a waviness detection kernel. An exemplary kernel is given by the following five-by-five matrix of values:

| | | | | |
|---|---|---|---|---|
| 0.0278 | −0.1111 | 0.1667 | −0.1111 | 0.0278 |
| −0.1111 | 0.4444 | −0.6667 | 0.4444 | −0.1111 |
| 0.1667 | −0.6667 | 1.0000 | −0.6667 | 0.1667 |
| −0.1111 | 0.4444 | −0.6667 | 0.4444 | −0.1111 |
| 0.0278 | −0.1111 | 0.1667 | −0.1111 | 0.0278 |

The "wavy" nature of the above set of numbers is illustrated graphically in FIG. 10, which illustrates the relative magnitudes of a five-row-by-five-column grid corresponding to pixel positions. The values in the rows and columns of the kernel shift between higher and lower values, or in this case, between negative and positive values, hence the term "wavy".

The kernel numbers above can be thought of as a small image window covering a corresponding five-by-five square of picture elements, which window is moved above (associated with successive corresponding portions of) the image. Each value in the kernel is multiplied by the corresponding image intensity value (right below it) and the final result of the operation is the sum of the results of the 25 multiplications. Generally, the closer the relative values of the intensities of the pixels overlaid by the window are to the relative values in the kernel, the higher the magnitude or absolute value of the resulting sum.

Figure 11A:
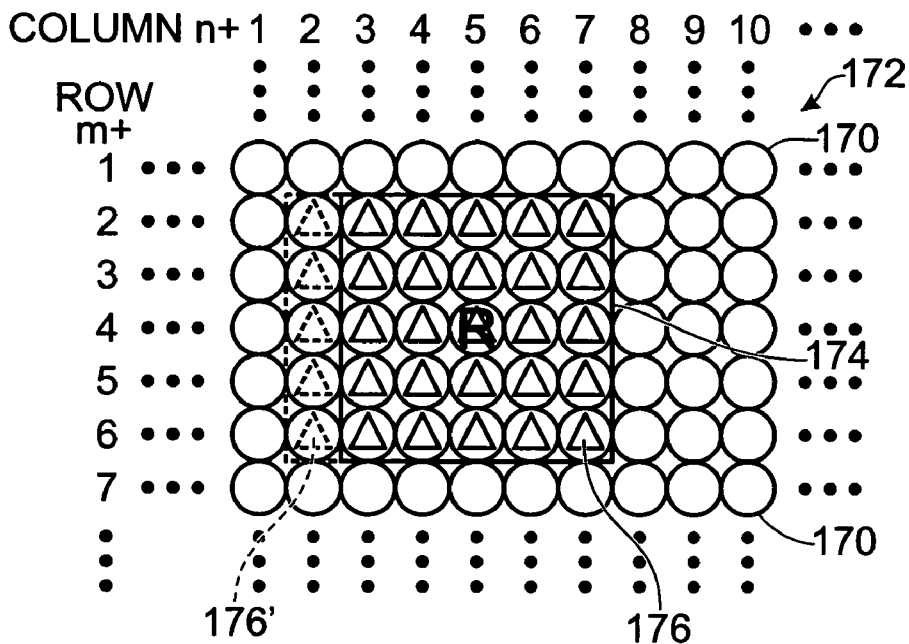
FIGS. 11A and 11B illustrate a sequence of steps illustrating application of a kernel to an image.
Figure 11B:
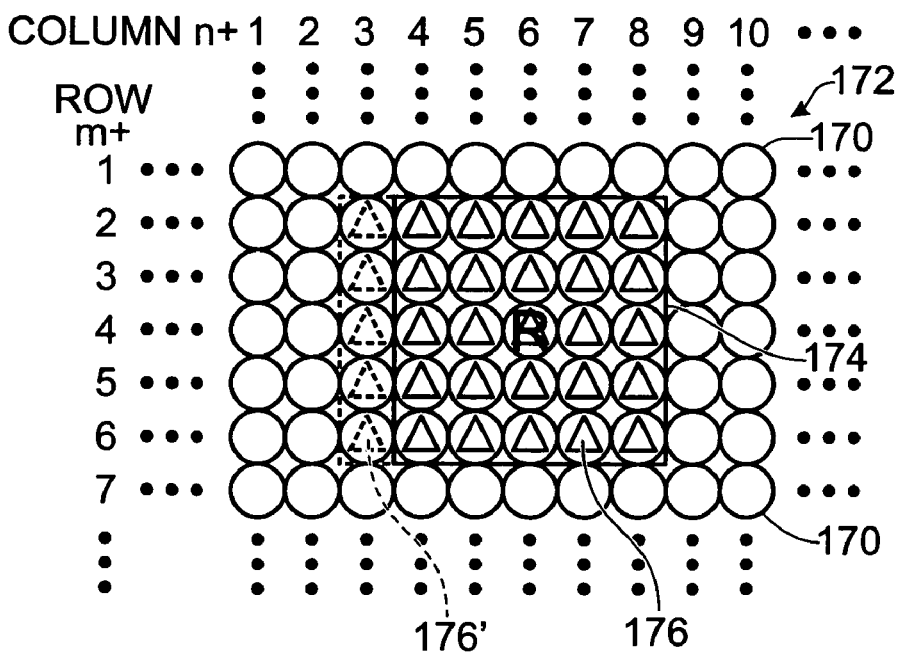

An illustration of this operation is depicted in FIGS. 11A and 11B, which show two consecutive positions of the kernel window. In these figures, the circles 170 represent the intensity levels of pixels making up a subject image 172. The square 174 represents the "window" of the kernel, with the kernel values represented by the triangles 176. The triangles 176' shown in dashed lines to the left of square 174 simply represent a row of pixels that were included in window 174 during the previous computation. As mentioned, each kernel value is multiplied by the intensity level of the pixel it is associated with in a given position of the window. The resulting 25 products are summed. The absolute value of the sum is assigned to a reference pixel R, which may be any pixel position considered appropriate. In this example, the pixel in the center of the window is considered the reference pixel.

This sum provides an indication of the correlation of the 25 pixels associated with the reference pixel to the relative variations or texture represented by the kernel. The higher the absolute value of the sum, the higher the correlation.

Figure 12:
FIG. 12 is an image resulting from applying the kernel of FIG. 10 to the image of FIG. 8 to identify suspect areas of the image.

FIG. 11B shows the position of window 174 during the next step in which the window is shifted one pixel row to the right. This process continues until the subject image 172 is convolved into a new "image" with its values containing the results of the above operation for each pixel or selected pixels of the image. After smoothing and stretching to occupy a fixed dynamic range, the new image is a "waviness image" 180 shown in FIG. 12, in which the lighter areas indicate the local presence of the waviness texture. In other words, the image of FIG. 12 is a mapping of the extent the selected subject-image characteristic is present. It is seen in the waviness image that the biggest and brightest regions of waviness appear where the knife and gun are in the original subject image.

Figure 13:
FIG. 13 is an image resulting from applying a threshold to the image of FIG. 12.

Once the waviness image is produced from the original subject image, the brightest regions of the waviness image may be identified by running a threshold analysis on the image. Small contrasting regions or holes may also be eliminated in order to make the resulting image more uniform. In this analysis, a new image 182 as shown in FIG. 13 is produced by assigning a distinct intensity level, such as that corresponding to white, to those regions of the waviness image having at least a selected intensity or waviness value, such as 80 percent of maximum. The other regions are assigned a distinguishable value, such as zero or black level intensity. This image then shows those regions in which strong correlation exists for the selected image characteristic.

Figure 14:
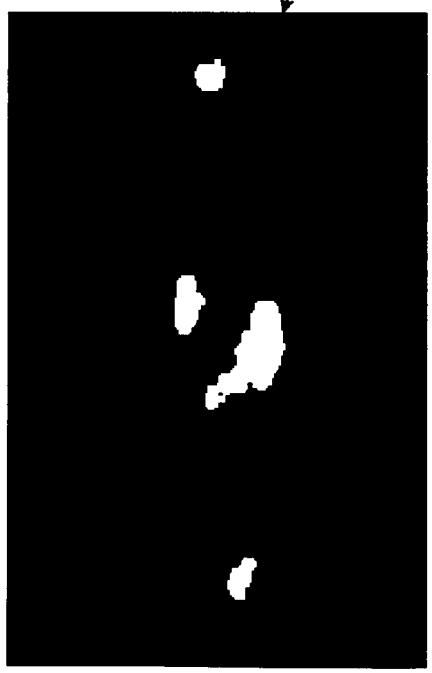
FIG. 14 is an image resulting from dilating the highlighted areas of the image of FIG. 13 and removing small regions.

The intent is to identify graphically those regions of the subject image where there are suspected objects. These regions can then be displayed or otherwise identified to a system operator, so that they can evaluate the images or the subject further. The above process may result in minor regions being identified for which it is unlikely that they correspond with an object on the person. The image may accordingly be cleaned up by dilating the highlighted spots and then deleting smaller regions not expected to be significant. Dilating is a process of expanding highlighted regions. One way of doing this is by passing another "window" of analysis or kernel over the image. For a given reference pixel, if there are more white pixels than a preset threshold, then the pixels in the entire window are made white. An exemplary result is shown as dilated image 184 in FIG. 14.

Figure 15:
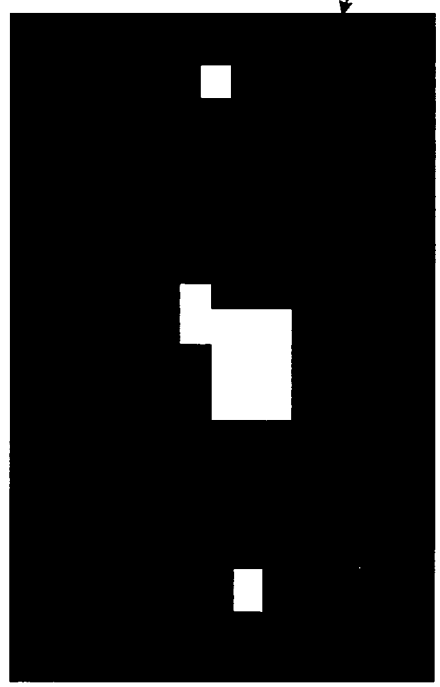
FIG. 15 is an image resulting from applying bounding rectangles to the highlighted areas of the image of FIG. 16.

To simplify the imaging of the suspected object areas, rectangles that bound the highlighted regions may be identified. FIG. 15 illustrates an image 186 that results from such a process. The rectangular regions are larger in size than the previously highlighted regions. Also, some regions may include more than one suspected area.

Figure 16:
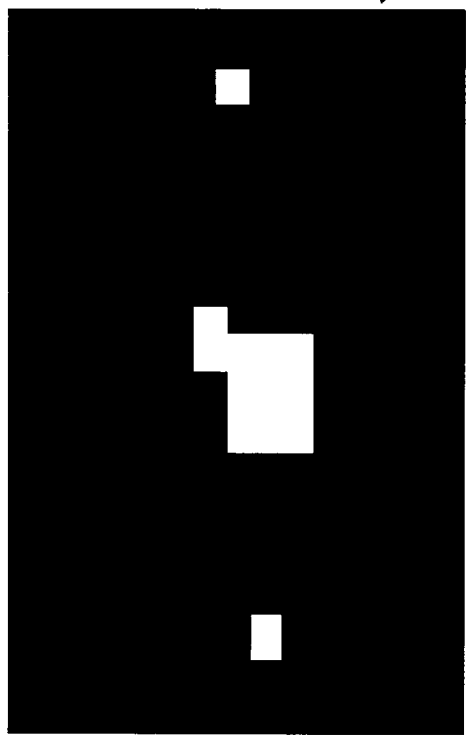
FIG. 16 is an image resulting from dilating the highlighted areas of the image of FIG. 17.

This image may again be dilated to further combine closely spaced areas. The image 188 that results from one such process is shown in FIG. 16. It is seen that in this case, the image of FIG. 16 is nearly the same as the image of FIG. 15. Different criteria for dilating may produce different results. This image may then be used to produce a final mask of the suspect areas.

Figure 17:
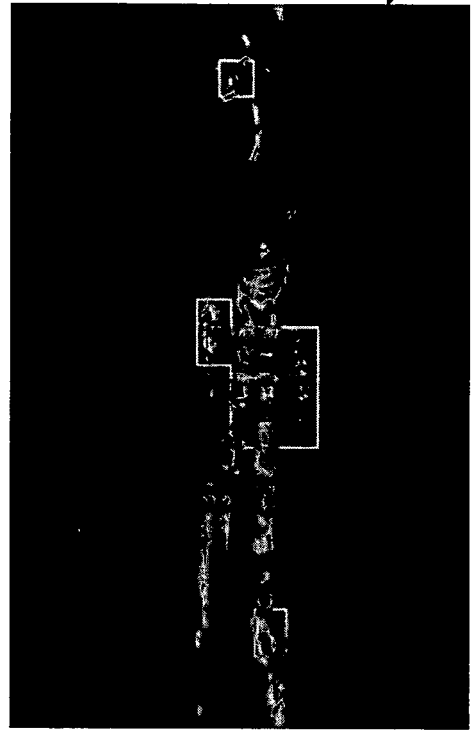
FIG. 17 is a copy of the original image of FIG. 8 superimposed with the outlines of the highlighted areas of FIG. 16, which correspond with suspect regions in the original image.

To facilitate the identification of objects on the subject image, the outlines of the suspect areas, derived from the image of FIG. 16, may be added to a display of the original image, as shown in FIG. 17. Image 190 shown in this figure is a reproduction of original image 160 shown in FIG. 8, with outlines of the suspect regions as defined by image 188. Optionally, as is shown in FIGS. 18 and 19 below, the portions of the original subject image within the suspect areas may be superimposed on a modified subject image, such as image 180 of FIG. 12, to preserve privacy concerns of a subject person.

As has been mentioned, a surveillance system 20 can be configured to provide both an image of a subject, as well as supplemental subject information. The source of supplemental subject information can be in the form of a sensor, such as a metal detector. As described with reference to the subject-information assembly 22 illustrated in FIGS. 5–7, metal can be detected in regions of the subject. These regions may be a plurality of vertically distributed zones, as may be provided by sensor apparatus 26" depicted in FIG. 7.

Figure 18:
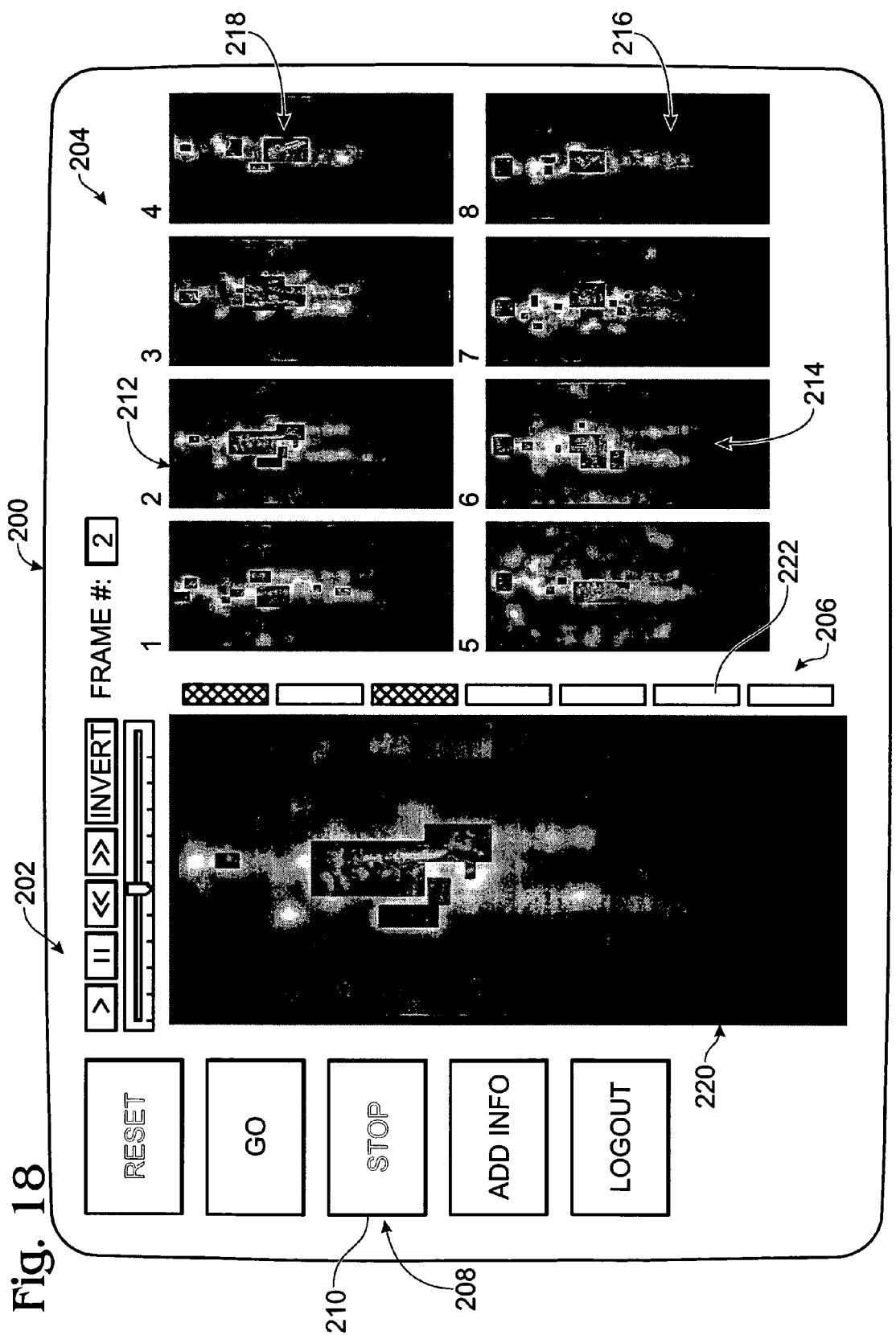
FIG. 18 is an exemplary display of a surveillance system having an imaging apparatus and a zonal metal detector, identifying various suspect regions of a subject and zones of the subject where metal is detected.
Figure 19:
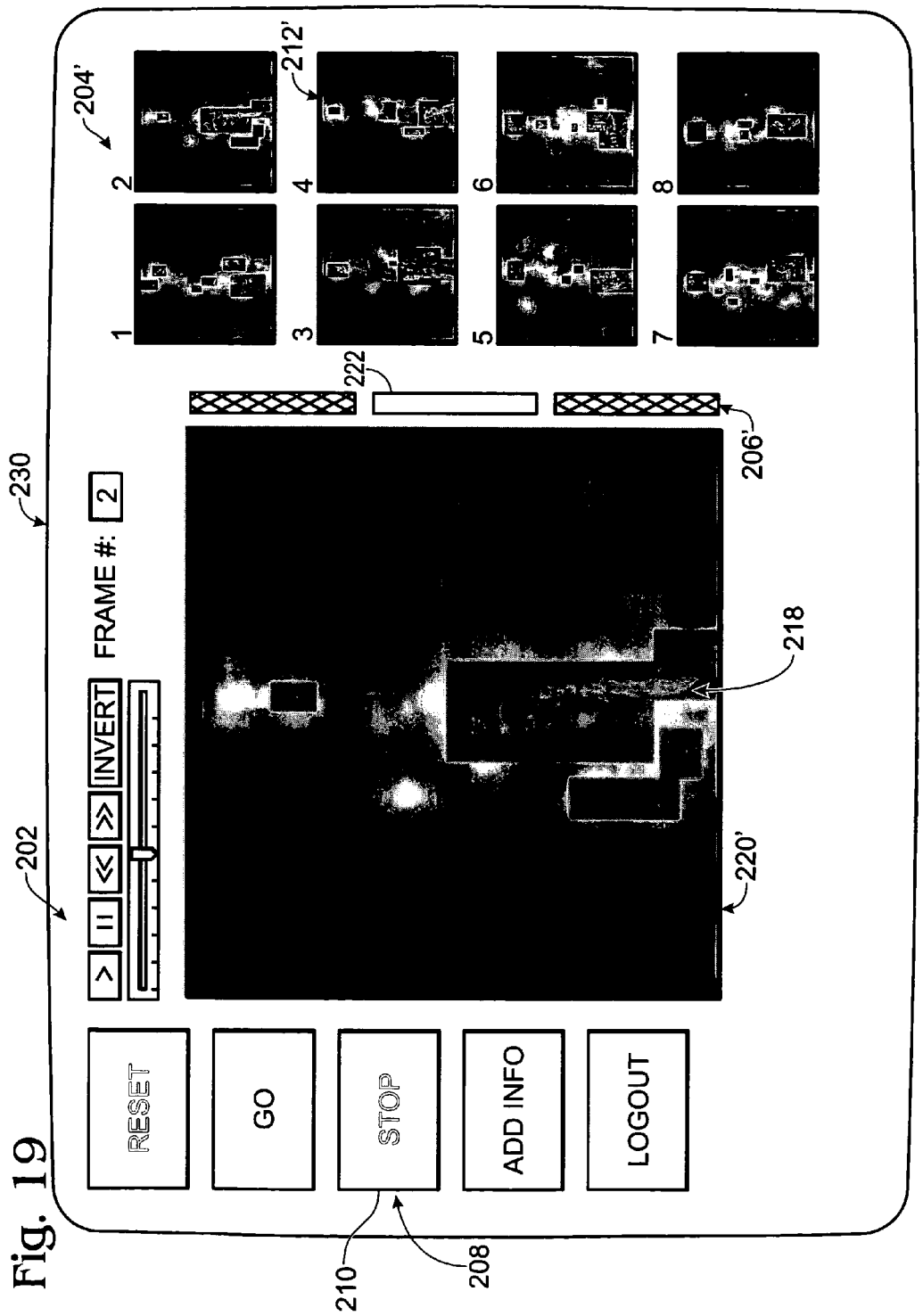
FIG. 19 is a display similar to FIG. 18 in which the subject images are cropped and a primary image is enlarged to show portions of the subject images having detected metal.

FIG. 18 illustrates a display 200 of an output device 132 of a surveillance system 20. Display 200 may be a computer-generated display of a control panel 202, displayed subject images 204, and a supplemental sensor output display 206. Control panel 202 may include a variety of display and system operation controls 208, such as control keys 210.

Various configurations of a subject image or images 204 can be provided. In this example, eight frames 212 of images corresponding to views of the subject at 45-degree increments around the subject are shown. Each frame includes a subject image 214, which in this instance is a privacy image 216 of the subject, such as provided by the process described with reference to FIGS. 8–17. Suspect regions 218 of the detailed subject image, such as regions identified by an object-identification algorithm, as discussed above, are super-imposed on the privacy images. A selected one of the eight frames is enlarged and displayed as a primary image 220. The enlarged frame includes enlargements of the suspect regions, making them easier to see by an operator.

Supplemental display 206 visually associates the results of operation of a second sensor apparatus 26. In this example, the second sensor apparatus may be a metal detector that determines the existence of metal in different vertical zones of the person's body. A display element 222 is aligned with each of the detected zones of the image 220. The display element in this case has a positive state, represented by a dark indication or distinctive color, when metal is detected in the corresponding zone of the subject. When no metal is detected for a particular zone, the display element has a negative state represented by a light indication or distinctive color. Other symbols, indicia or representations could be used to indicate the results of the second sensor apparatus relative to the subject image.

It is seen that for the selected primary image 220 shown in FIG. 18, suspect regions 218 exist in the pelvic, lower torso and head regions. The top and third down metal display elements 222 are shown to be in the positive state and the others are in the negative state, indicating that one or more of the objects identified in each of these two zones is or are made of metal. Based on this result, the surveilled person could be watched or apprehended, to prevent entry into an associated facility, or take any other action deemed appropriate in the circumstances.

When there is a match or correlation of detected information in a particular location or particular locations of a subject, one or more images may be further enlarged or cropped to focus attention on and provide additional detail of the suspect regions or zones where metal is detected. An additional display 230 that may be provided, is shown in FIG. 19. This display generally has the same features as display 200, and corresponding features are shown with a prime. The image frames 212' and primary image 220' are rearranged, enlarged, and/or cropped to show suspect regions 218, and eliminate continuous zones that do not have a suspect region or an indication of positive metal detection. The enlarged images, such as enlarged primary image 232, may be provided without further alteration, or may provide increased resolution. The image resolution can be increased by image-enhancement or editing software, as well as by rescanning the subject with the same array in a higher resolution mode, or with a finer-resolution array.

Although not shown in the figures, a surveillance system may also be adapted to provide images of regions of a subject for which no suspect regions are identified, but for which a supplemental sensor detects a substance or other characteristic. In the case where metal is detected in a zone for which no suspect regions are identified, an enlargement of the image of the affected zone provides improved resolution or detail, to show whether an external object is present in that zone.

While the inventions defined in the following claims have been particularly shown and described with reference to the foregoing embodiments, those skilled in the art will understand that many variations may be made therein without departing from the spirit and scope of the inventions. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure.

The foregoing embodiments are illustrative, and no single feature or element is essential to all possible combinations that may be claimed in this or later applications. Where the claims recite "a" or "a first" element or the equivalent thereof, such claims should be understood to include one or more such elements, neither requiring nor excluding two or more such elements. Further, cardinal indicators, such as first, second, and third, for identified elements are used to distinguish between the elements, and do not indicate a required or limited number of such elements, nor does it indicate a particular position or order of such elements unless otherwise specifically stated.

INDUSTRIAL APPLICABILITY

The methods and apparatus described in the present disclosure are applicable to security, monitoring and other industries in which surveillance and imaging systems are utilized.

What is claimed is:

1. A surveillance system comprising:
   a first sensor apparatus adapted to transmit toward and receive from a subject in a subject position, first electromagnetic radiation in a frequency range of about 100 MHz to about 2 THz, from positions spaced from the subject position, the subject including at least a portion of a person in a subject position and detectable objects carried by the person, the first sensor apparatus producing from the received radiation, a first image signal representative of a first image of at least a portion of the subject;
   a source of subject information data about the subject that is relatable to objects potentially carried by the person, the source being of a type that is different from the first sensor apparatus; and
   a controller adapted to control operation of the first sensor apparatus, and to produce, from the produced image signal, image data representative of the image of the at least a portion of the subject, to relate the image data to the subject information data, and to produce relational information data relating the image data and the subject information data.

2. The system of claim 1, in which the sensor apparatus and the controller are adapted to produce the image data corresponding to a three-dimensional holographic first image of at least a portion of the subject.

3. The system of claim 2, in which the source of subject information data is a second sensor apparatus adapted to detect first object information about an object potentially carried by the person, and the controller is adapted to produce object data indicative of whether the person carries an object that includes the object information.

4. The system of claim 3, in which the object information is one or more of a metal substance, an explosive substance, and a given chemical substance.

5. The system of claim 3, in which the controller is adapted to produce first object-image data indicative of whether the image includes characteristics corresponding to an object on the person, and to relate the object data to the object-image data.

6. The system of claim 1, in which the source is a second sensor apparatus adapted to detect second radiation transmitted from the subject, and to produce the subject information data as a second image signal representative of received second radiation, and the controller is further adapted to produce first and second image data from the respective first and second image signals, and to produce relational information data relating the first and second image data.

7. The system of claim 6, in which the controller is adapted to produce first object-image data indicative of portions of the first image data that include first image characteristics corresponding to one or more objects carried by the person, to produce second object-image data indicative of portions of the second image data that include second image characteristics corresponding to one or more objects carried by the person, and to produce the relational information data relating the first object-image data to the second object-image data.

8. The system of claim 7, in which the controller is further adapted to identify first and second object-image data indicative of one or more objects located near the same portions of the subject, and to produce the relational information data identifying the portions of the subject for which objects are identified from the first and second object-image data.

9. The system of claim 8, in which the controller is further adapted to assign one or more of a relative weight, value, attribute, and relative indicator to each object identified based on the relational information data.

10. The system of claim 6, in which the second sensor apparatus detects electromagnetic radiation in at least one specific range of frequencies.

11. The system of claim 10, in which the second sensor apparatus detects one or more of visible radiation, infrared radiation, radio-frequency radiation, Terahertz radiation, and x-ray radiation.

12. The system of claim 1, in which the source is a second sensor apparatus adapted to detect subject information for different associated areas of the person and to produce the subject information data from the detected subject information, and the controller is adapted to produce first object-image data indicative of portions of an image that include first image characteristics corresponding to one or more objects carried by the person, and to produce the relational information data relating produced subject information data corresponding to detected subject information at associated areas to object-image data for portions of the image corresponding to the associated areas.

13. The system of claim 12, further comprising a first moving mechanism adapted to move the first and second sensor apparatus relative to the subject position.

14. The system of claim 13, further comprising a second moving mechanism adapted to move one of the first and second sensor apparatus relative to the other.

15. The system of claim 14, in which the controller is adapted to produce object-image data indicative of whether the first image includes characteristics corresponding to an object on the person, and to control the second moving mechanism to move the second sensor apparatus relative to the subject position when the object-image data is indicative of portions of the image that include image characteristics.

16. The system of claim 14, wherein the second sensor apparatus is adapted to detect first object information about an object potentially carried by the person, the system further comprising a third sensor apparatus adapted to detect second object information about a detectable object, the second object information being different than the first object information and the third sensor apparatus not being adapted to transmit toward and receive from the subject, electromagnetic radiation in a frequency range of about 100 MHz to about 2 THz.

17. The system of claim 16, in which the second moving mechanism is adapted to move the third sensor apparatus, and the controller is adapted to control the second moving mechanism to move the third sensor apparatus relative to the subject position when the first object information is not detected by the second sensor apparatus.

18. The system of claim 1, in which the source includes a second sensor apparatus adapted to detect one or more of a metal, an explosive, a chemical substance, and a feature identifying the person.

19. The system of claim 1, in which the source includes a second sensor apparatus adapted to detect a feature identifying the person, and the source further includes context information data relating the feature identifying the person with data defining a policy regarding concealed objects potentially carried by each person associated with the identifying feature.

20. The system of claim 19, in which the controller is further adapted to assign a relative value to each object identified based on the context information data.

21. The system of claim 1, in which the source is adapted to receive information data identifying a characteristic of the person, and the source further includes context information data relating the identifying information data with data defining a policy regarding concealed objects potentially carried by each person to which the identifying information data applies.

22. The system of claim 21, in which the source includes a second sensor apparatus adapted to detect an identifying item associated with the person, and to produce the identifying information data.

23. The system of claim 22, in which the identifying item is one or more of a physical feature of the person and an identifying object carried by the person.

24. The system of claim 23, in which the identifying item is a physical feature that is one or more of a fingerprint, a retinal image, a facial image, and a volumetric representation.

25. The system of claim 23, in which the identifying item is an identifying object that is one or more of a badge and a radio-frequency identification device.

26. A method of surveilling a subject in a subject position, the subject including a person and objects carried by the person, comprising:
  transmitting toward a subject in a subject position, first electromagnetic radiation in a frequency range of about 100 MHz to about 2 THz, from positions spaced from the subject position, the subject including at least a portion of a person in a subject position and detectable objects carried by the person;
  receiving from the subject reflected transmitted radiation;
  producing from the received radiation, a first image signal representative of a first image of at least a portion of the subject;
  storing subject information data about the subject that is relatable to objects potentially carried by the person, the subject information data not being derived from the image signal;
  producing, from the produced image signal, image data representative of the image of the at least a portion of the subject;
  relating the image data to the subject information data; and
  producing relational information data relating the image data and the subject information data.

27. The method of claim 26, further comprising producing the image data corresponding to a three-dimensional holographic first image of at least a portion of the subject.

28. The method of claim 27, further comprising detecting first object information about an object potentially carried by the person from a source other than the image signal, and producing object data indicative of whether the person carries an object, based on the object information.

29. The method of claim 28, in which detecting object information includes detecting one or more of a metal substance, an explosive substance, and a given chemical substance.

30. The method of claim 28, further comprising producing, from the image signal, first object-image data indicative of whether the image includes characteristics corresponding to an object on the person, and relating the object data to the object-image data.

31. The method of claim 26, further comprising detecting second radiation transmitted from the subject, and producing a second image signal representative of received second radiation, and producing second image data from the second image signal; and in which producing relational information data includes producing relational information data, relating the first and second image data.

32. The method of claim 31, further comprising producing first object-image data indicative of portions of the first image data that include first image characteristics corresponding to one or more objects carried by the person, and producing second object-image data indicative of portions of the second image data that include second image characteristics corresponding to one or more objects carried by the person; and in which producing relational information data includes producing relational information data relating the first object-image data to the second object-image data.

33. The method of claim 32, further comprising identifying first and second object-image data indicative of one or more objects located near the same portions of the subject, and producing relational information data identifying the portions of the subject for which objects are identified from the first and second object-image data.

34. The method of claim 33, further comprising assigning a relative value to each object identified based on the relational information data.

35. The method of claim 31, in which detecting second radiation includes detecting one or more of optical radiation, infrared radiation, radio-frequency radiation, Terahertz radiation, and x-ray radiation.

36. The method of claim 26, further comprising detecting the subject information for different associated areas of the person, and producing from the image signal, first object-image data indicative of portions of an image that include first image characteristics corresponding to one or more objects carried by the person; and in which producing relational information data includes producing relational information data relating subject information at associated areas to object-image data for portions of the image corresponding to the associated areas.

37. The method of claim 36, in which transmitting and receiving radiation includes transmitting and receiving radiation using a first sensor apparatus, and in which detecting subject information includes detecting subject information using a second sensor apparatus, and further comprising moving the first and second sensor apparatus relative to the subject position during transmitting, receiving, and detecting.

38. The method of claim 37, further comprising moving one of the first and second sensor apparatus relative to the other.

39. The method of claim 38, further comprising producing object-image data indicative of whether the first image includes characteristics corresponding to an object on the person, and moving the second sensor apparatus relative to the subject position when the object-image data is indicative of portions of the image that include image characteristics.

40. The method of claim 39, further comprising detecting with the second sensor apparatus first object information about an object potentially carried by the person, and detecting with a third sensor apparatus, second object information about a detectable object, the second object information being different than the first object information and the image signal, and moving the third sensor apparatus while detecting the second object information when the first object information is not detected by the second sensor apparatus.

41. The method of claim 26, in which the subject information includes one or more of a metal substance, an explosive substance, a chemical substance, and a feature identifying the person, the method further comprising detecting in the subject, one or more of a metal substance, an explosive substance, a chemical substance, and a feature identifying the person.

42. The system of claim 26, further comprising detecting a feature identifying the person, and storing subject information data includes storing context information data relating the feature identifying the person with a policy regarding the appropriateness of concealed objects potentially carried by each person associated with the identifying feature.

43. The method of claim 42, further comprising assigning a relative value to each object identified based on the context information data.

44. The method of claim 26, in which storing subject information data includes storing information data identifying a characteristic of the person, and storing context information data relating the identifying information data with a policy regarding the appropriateness of concealed objects potentially carried by each person to which the identifying information data applies.

45. The method of claim 44, further comprising detecting an identifying item associated with the person, and producing the identifying information data based on the identifying item.

46. The method of claim 45, in which detecting an identifying item includes detecting one or more of a physical feature of the person and an identifying object carried by the person.

47. The method of claim 46, in which detecting an identifying item includes detecting one or more of a fingerprint, a retinal image, a facial image, and a volumetric representation.

48. The method of claim 46, in which detecting an identifying item includes detecting one or more of a badge and a radio-frequency identification device.

* * * * *